United States Patent Office 3,373,152
Patented Mar. 12, 1968

3,373,152
METHOD OF DEGASSING VISCOSE
Harry F. Haeusel, Chester, Pa., assignor to FMC Corporation, Philadelphia, Pa., a corporation of Delaware
No Drawing. Filed Nov. 23, 1964, Ser. No. 413,365
6 Claims. (Cl. 260—218)

This invention relates to the manufacture of shaped regenerated cellulose products, and more particularly to a method for removing air and other gases from viscose.

In the manufacture of shaped regenerated cellulose products, a shaped stream of viscose is extruded into an acid-sulfate bath where it is coagulated and regenerated to provide the desired product. The viscose itself is prepared by mixing aged alkali cellulose crumbs with carbon disulfide until the alkali cellulose is xanthated. This cellulose xanthate in crumb form is then mixed with dilute aqueous sodium hydroxide solution, the amount and concentration of which being such as to provide a viscose containing from about 4 to 15% cellulose and from 4 to 10% caustic in the final mixture. During and/or after a ripening stage the viscose is deaerated to remove air and other gases which are dissolved or otherwise entrained therein.

The gases within the viscose are generally present in the form of bubbles which, if permitted to remain, would cause extrusion problems and would provide inferior products. For example, in the manufacture of artificial filaments, an incompletely deaerated viscose would cause broken filaments, plugging of extrusion orifices and non-uniform and thus inferior yarns.

Various degassing or deaeration methods have been proposed and employed. One known method involves subjecting a batch of viscose to a vacuum to cause entrained gas bubbles to rise to the surface of the viscose and then be removed. A similar procedure involves spreading the viscose as a thin film or layer. The entrained gases have only a short distance to travel to reach the film surface so that more rapid degassification of the viscose is possible. Both of these conventional procedures, however, are time consuming and require a larger storage capacity. For example, with the batch method deaeration is completed in about 20 to 24 hours, while the film deaeration procedure requires from about 11 to 12 hours. Accordingly, the primary object of this invention is to provide a generally new and more satisfactory method of degassifying viscose.

Another object of this invention is the provision of an improved method which will decrease the time necessary for deaerating of viscose.

Still another object of this invention is the provision of an improved method for rapidly removing entrained gases from viscose without subjecting the same to a vacuum.

A still further object is to provide a chronologically young viscose which is suitable for extrusion into shaped products.

These objects are accomplished in accordance with the present invention by a method which involves mixing oxygen with a viscose during and/or after it has been prepared; that is, while and/or after the xanthated crumb is being mixed with dilute aqueous sodium hydroxide, and then allowing the oxygen treated viscose to remain in a quiescent condition at atmospheric pressure for a relatively short period before being extruded. The excise of all of the above-noted steps of the present invention is necessary for providing a degassed viscose which is suitable for extrusion into shaped structures. The mixing step which accompanies the oxygen addition serves to expose and displace the gases which are entrained in the viscose by the added oxygen, while the step of maintaining the viscose in a quiescent condition after mixing prevents re-introduction into the viscose of the expelled gases.

The mechanism by which oxygen accomplishes the degassing of viscose is still under study. It is known, however, that oxygen must be employed to achieve the desired viscose deaeration and, as noted above, that the added oxygen must be thoroughly mixed with the viscose. The desired degassing effect cannot be achieved by intermixing the viscose with air or other gases, such as nitrogen, carbon dioxide, ammonia, helium, hydrogen, and argon. My studies have indicated that treatment of viscose with nitrogen, helium and argon provides for an increase in the number of undesired gas bubbles, while the addition of carbon dioxide, even in small quantities, of course, causes the viscose to gel. The failure of the inert gases to cause degassing of viscose is of particular significance since it indicates that the action involved is not merely one of sweeping out gas bubbles, and that the mechanism of the method of the present invention involves a chemical and/or physical reaction between the added oxygen and components which are present in a conventional viscose.

The amount of oxygen which is necessary for degassing a viscose will vary with the particular conditions which are involved and will depend upon such factors as the age and the composition of the viscose as well as the efficiency of the apparatus which is employed in obtaining a thorough dispersion of the oxygen in the viscose. Generally, the amount of oxygen required for the deaeration will gradually decrease with the increase in the age of the viscose and will increase with the increase in the cellulose level.

As heretofore emphasized, a thorough mixing of the oxygen and the viscose is essential for achieving the desired degassing effect. Generally, bubbling the oxygen up through the viscose assists in obtaining a good dispersion of the same through the viscose but does not, by itself provide for satisfactory mixing. The rate and location of oxygen introduction should be such so as to encourage sufficient mixing thereof throughout the viscose. Rapid passage of large oxygen bubbles through the viscose does not serve to disperse and expose the oxygen to the entrained gases and should therefore be avoided. Additionally, the oxygen should be introduced at such locations as to permit the mixing means, such as paddles or blades, to rapidly and thoroughly disperse the same throughout the viscose.

Of additional importance is that the viscose itself must be treated with oxygen to achieve the desired degassing results. More particularly, and as heretofore mentioned, the oxygen must be added into the viscose while and/or after the xanthated crumb is mixed with dilute aqueous sodium hydroxide. Adding oxygen at any prior stage of the viscose manufacturing process provides for no apparent improvement in the resulting viscose from the degassing standpoint. In other words, viscose made from alkali cellulose crumbs which have been treated with oxygen just prior to or just after xanthation contains a considerable amount of entrained gases and does not deaerate any more rapidly than conventional viscose.

Compared with viscose deaerated by conventional procedures viscose deaerated in accordance with the method of the present invention generally possesses a small decrease in viscosity. Yarns formed from such oxygen treated viscose show no apparent change over conventional yarns in D.P. (degree of polymerization) and physical properties.

Generally, deaeration of viscose by the method of the present invention is completed within 2 to 5 hours. Since degassing by conventional systems requires from about 11 to 24 hours, depending upon whether a batch or film degassing method is employed, the economic advantage of the oxygen degassing method described above is readily apparent. Perhaps equally important is that the described degassing method enables chronologically young viscose to be spun into yarns.

The following examples are given to further illustrate the method of the present invention, it being understood that the details set forth in these examples are not to be considered limiting the invention thereto.

EXAMPLE I

A number of viscose samples were prepared by conventional procedures and deaerated in accordance with the method of the present invention by bubbling oxygen up through the viscose at the rate of 3 c.f.h. (cubic feet per hour) for a period of 30 minutes while the viscose was being mixed. These treated viscose samples were then permitted to remain in a quiescent condition at atmospheric pressure and were bubble-free in periods ranging from 2 to about 4 hours. The samples had a 5.0% cellulose and 6.0% sodium hydroxide content, an average ball fall of 70 during mixing and 53 when being spun, and a carbon disulfide level which ranged from 28 to 46% based on cellulose.

Using conventional spinning baths, these viscose samples were spun into 1650/1500 yarns. The properties of these yarns are set forth in the following table:

TABLE A

| Sample | $CS_2$ Level Percent based on cellulose | Yarn Tenacity,[1] grams/denier | Cord[2] Tenacity,[1] grams/denier |
|---|---|---|---|
| A | 28 | 5.8 | |
| B | 32 | 6.3 | 4.8 |
| C | 36 | 6.4 | |
| D | 40 | 6.4 | 4.8 |
| E | 44 | 6.0 | 4.7 |
| F | 46 | 5.0 | |

[1] Oven dried samples.
[2] Cord was 3,800 denier of 12Z by 12S construction.

EXAMPLE II

Viscose prepared as described in Example I was deaerated in accordance with the present invention by bubbling 2 c.f.h. of oxygen up through the viscose for a period of 120 minutes and were in condition for spinning in from two to four hours. The oxygen treated viscose had a 7.5% cellulose and 6.5% sodium hydroxide content, an average ball fall during mixture of 70 and 57 during the subsequent spinning, and a carbon disulfide level within the range of 32 to 40.

As in Example I these oxygen treated viscose samples were spun into 1560/1500 yarns. The properties of these yarns are set forth in the following table:

TABLE B

| Sample | $CS_2$ Level | Yarn Tenacity,[1] grams/denier | Cord[2] Tenacity,[1] grams/denier |
|---|---|---|---|
| G | 32 | 6.1 | |
| H | 35 | 6.3 | |
| I | 38 | 6.1 | 4.5 |
| J | 40 | 6.2 | 4.2 |

[1] Oven dried samples.
[2] Cord was 3,800 denier of 12Z by 12S twist construction.

It is to be understood that changes and variations may be made without departing from the spirit and scope of the invention as defined in the appended claims.

I claim:

1. A method of degassing viscose containing aqueous sodium hydroxide including the steps of adding oxygen into the viscose, mixing the viscose during the oxygen addition to disperse the oxygen throughout the viscose and maintaining the oxygen treated viscose in a quiescent condition after the mixing thereof whereby the added oxygen and entrained gases are expelled therefrom.

2. A method of degassing viscose containing aqueous sodium hydroxide including the steps of adding oxygen into the viscose, mixing the viscose during the oxygen addition to disperse the oxygen throughout the viscose, and maintaining the oxygen treated viscose in a quiescent condition and at atmospheric pressure whereby the added oxygen and entrained gases are expelled therefrom.

3. A method of degassing viscose containing aqueous sodium hydroxide including the steps of bubbling oxygen up through the viscose, mixing the viscose during the oxygen addition, and maintaining the oxygen treated viscose in a quiescent condition at atmospheric pressure following the mixing to permit the added oxygen and entrained gases to escape therefrom.

4. A method as defined in claim 3 wherein the viscose is maintained in a quiescent condition of from 2 to 5 hours.

5. A method of making a deaerated viscose including the steps of mixing xanthated alkali cellulose crumb with dilute aqueous sodium hydroxide to form viscose, adding oxygen at least during the mixing of the formed viscose, and permitting the viscose to remain in a quiescent condition following the mixing thereof whereby the added oxygen and entrained gases escape therefrom.

6. A method as defined in claim 5, in which oxygen is added both during the mixing of the xanthated alkali cellulose crumb with dilute aqueous sodium hydroxide and during the mixing of the formed viscose.

References Cited

UNITED STATES PATENTS 3,007,919 11/1961 Hoskins _____ 260—218
2,887,267 5/1959 Lagen _____ 260—218
2,714,938 8/1955 Smith _____ 260—218

DONALD E. CZAJA, Primary Examiner.

LEON J. BERCOVITZ, Examiner.

R. W. MULCAHY, Assistant Examiner.